Jan. 2, 1923.
C. P. STRITE.
BREAD TOASTER.
FILED DEC. 9, 1920.
1,440,643
3 SHEETS-SHEET 1
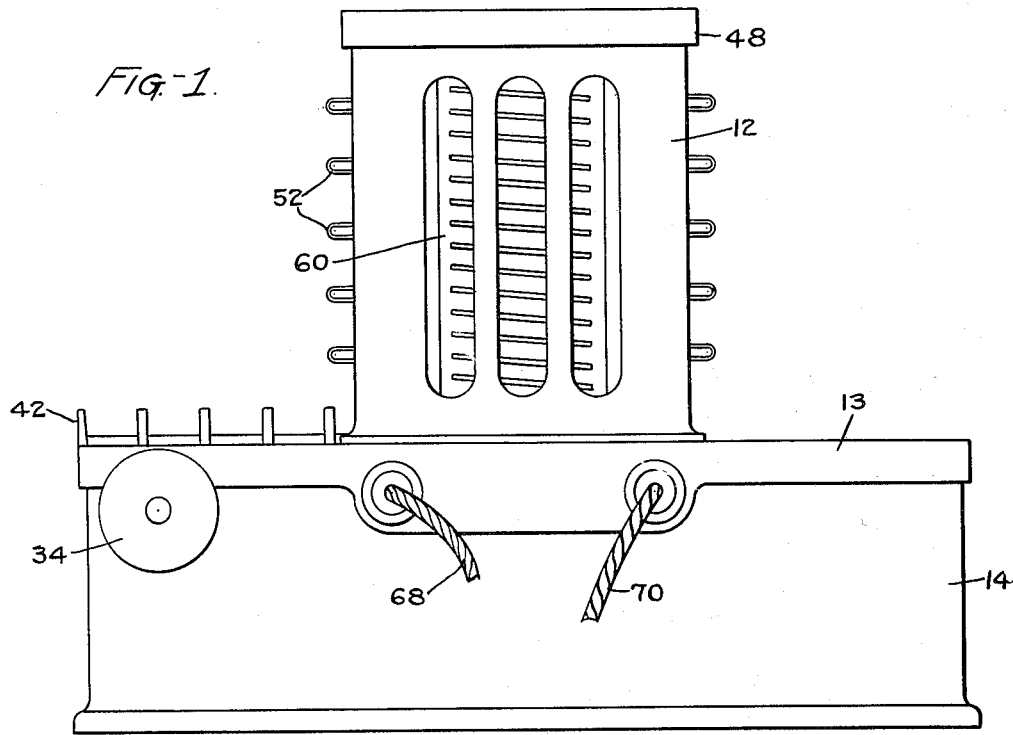
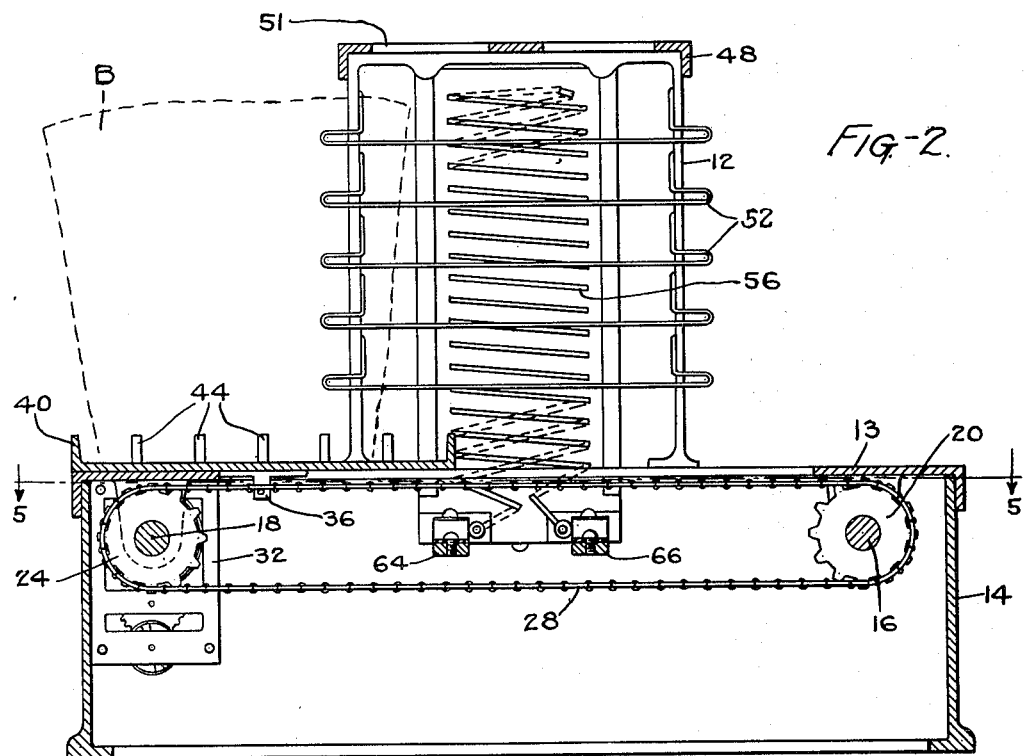
INVENTOR:
CHARLES P. STRITE.
BY Whiteley and Ruckman
ATTORNEYS.

Jan. 2, 1923.

C. P. STRITE.
BREAD TOASTER.
FILED DEC. 9, 1920.

1,440,643

3 SHEETS-SHEET 2

INVENTOR:
CHARLES P. STRITE.
BY Whiteley and Ruckman
ATTORNEYS.

Jan. 2, 1923.

C. P. STRITE.
BREAD TOASTER.
FILED DEC. 9, 1920.

1,440,643

3 SHEETS-SHEET 3

INVENTOR:
CHARLES P. STRITE.
BY Whiteley and Ruckman
ATTORNEYS.

Patented Jan. 2, 1923.

1,440,643

UNITED STATES PATENT OFFICE.

CHARLES P. STRITE, OF MINNEAPOLIS, MINNESOTA.

BREAD TOASTER.

Application filed December 9, 1920. Serial No. 429,347.

*To all whom it may concern:*

Be it known that I, CHARLES P. STRITE, a citizen of the United States, residing at Minneapolis, in the county of Hennepin and State of Minnesota, have invented certain new and useful Improvements in Bread Toasters, of which the following is a specification.

My invention relates to bread toasters.
An object is to provide a bread toaster, preferably electrically heated, in which the bread will be uniformly toasted on both sides at the same time without light and dark spots and without danger of burning the toast even if it is not being watched by the operator. Another object is to provide a device of this character in which the operator will be apprised of the fact that the toasting operation is completed without the necessity of inspecting the toast. I accomplish the objects of my invention by providing means for conveying the bread to be toasted through an oven and which carries the toast out of the oven when the toasting operation is finished.

The full objects and advantages of my invention will appear in connection with the detailed description thereof, and the novel features embodied in my inventive idea will be particularly pointed out in the claims. In the accompanying drawings which illustrate the application of my invention in one form,—

Figure 3:
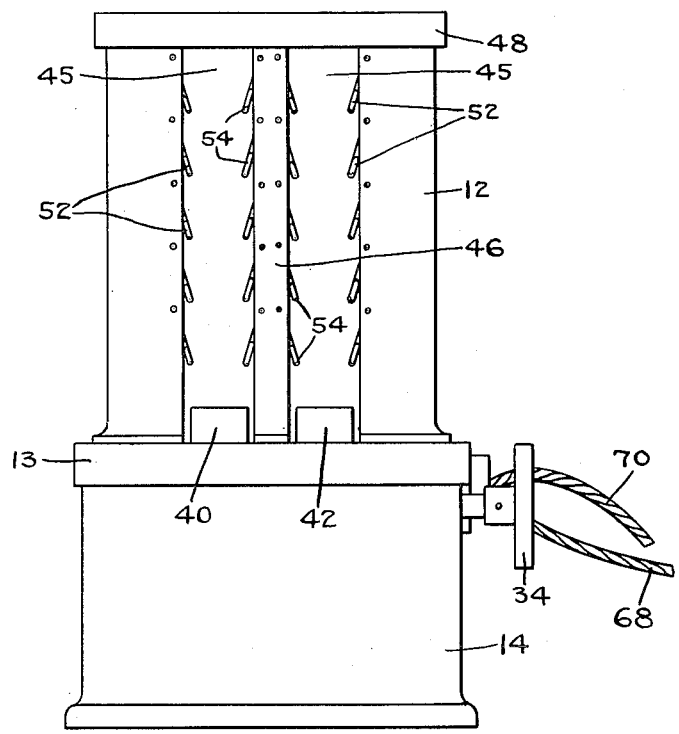
Figure 4:
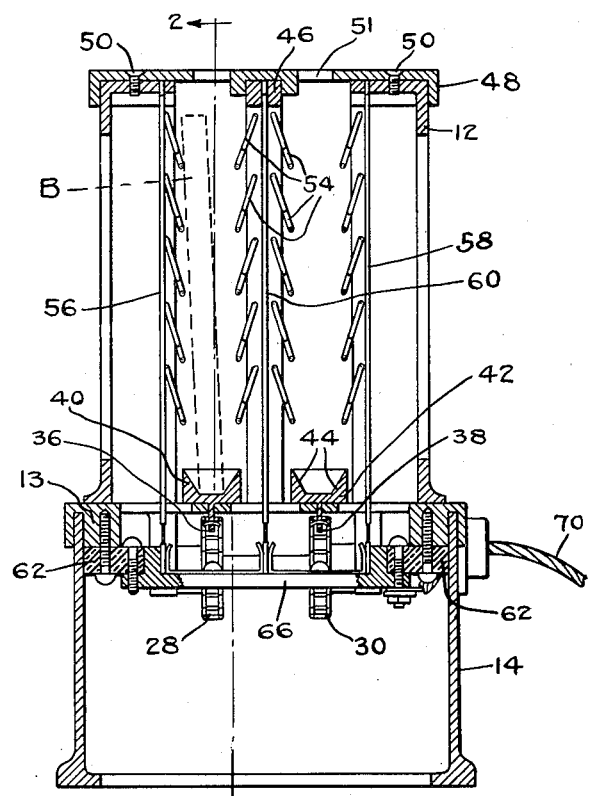
Figure 5:
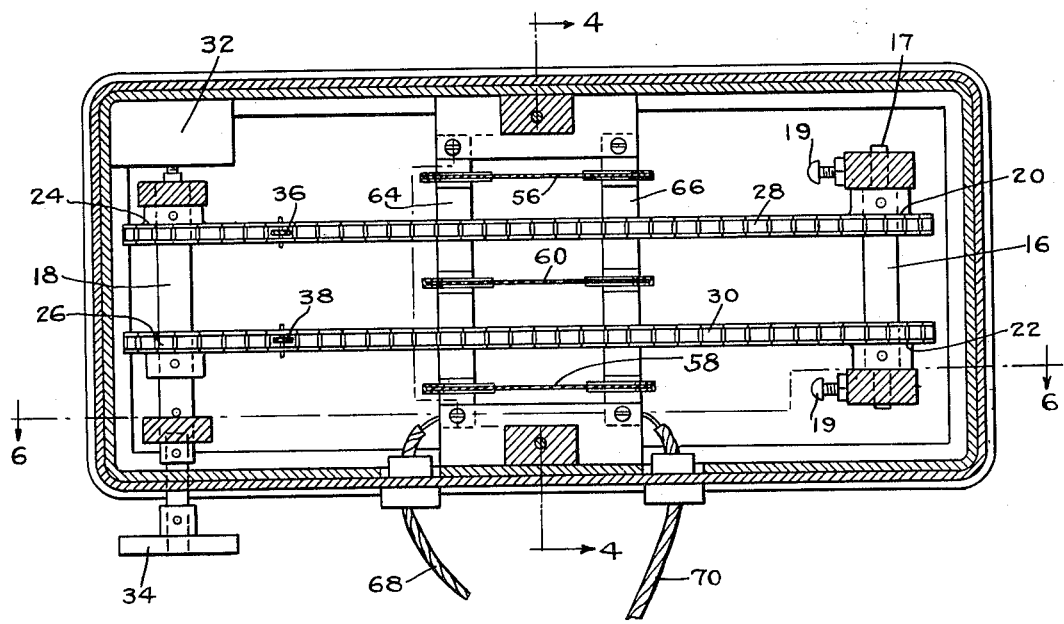
Figure 6:
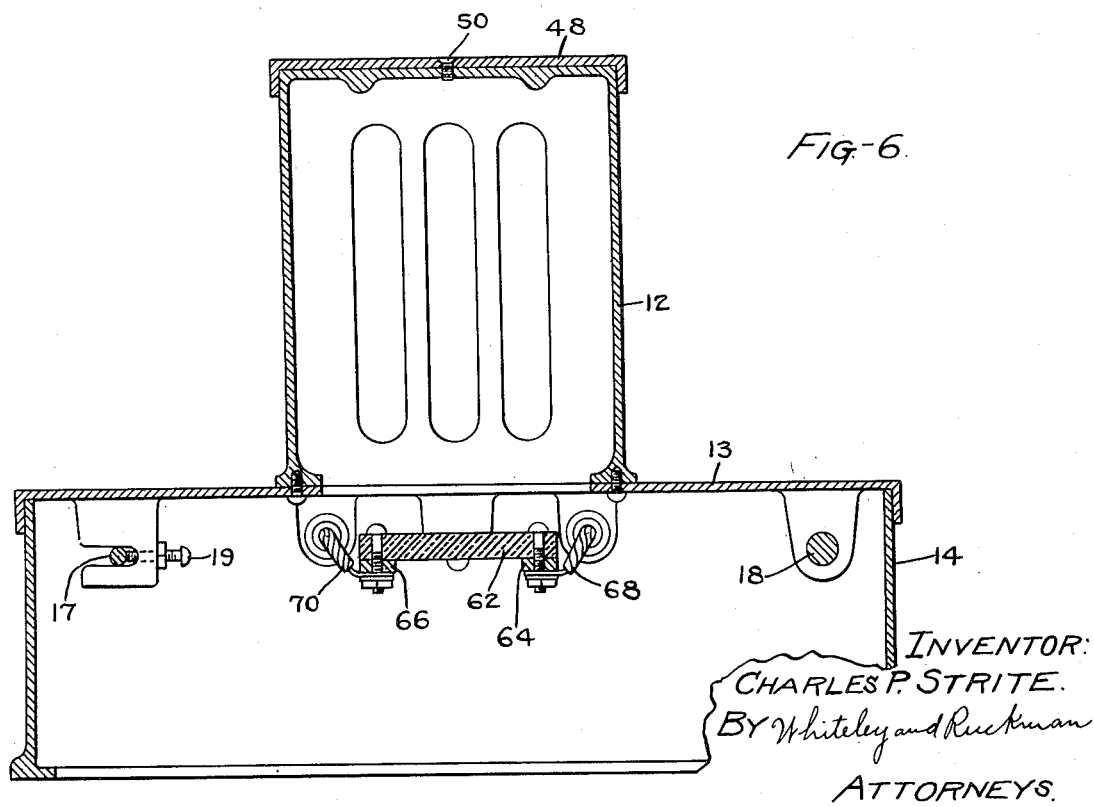

Fig. 1 is a side elevational view of my toaster. Fig. 2 is a view in longitudinal vertical section on the line 2—2 of Fig. 4. Fig. 3 is an end elevational view. Fig. 4 is a view in transverse vertical section on the line 4—4 of Fig. 5. Fig. 5 is a view in horizontal section on the line 5—5 of Fig. 2. Fig. 6 is a view in longitudinal vertical section on the line 6—6 of Fig. 5.

Referring to the particular construction shown in the drawings, the numeral 12 designates in general an upper casing or oven which is secured to the cover 13 of a lower casing 14. Shafts 16 and 18 are rotatably supported by brackets depending from the cover 13. A pair of sprocket wheels 20 and 22 are secured to the shaft 16, and a pair of sprocket wheels 24 and 26 are secured to the shaft 18. Extending over these sprocket wheels are a pair of endless sprocket chains 28 and 30. Operatively connected with one end of the shaft 18 is a clockwork mechanism 32, and secured to the other end of the shaft 18 is a handle or knob 34 by means of which the clockwork mechanism may be wound. The shaft 16 is preferably a hollow shaft mounted upon a rod 17 whose position may be adjusted by set screws 19 so that the tension of the sprocket chains may be varied. Depending through slots in the cover 13 and secured to the chains 28 and 30 are stems 36 and 38 which at their upper ends are secured to bread carriers 40 and 42. These bread carriers are provided with end lugs and are also provided with pairs of side lugs 44, best shown in Figs. 2 and 4 for supporting in vertical position slices of bread indicated in dotted lines and designated by the character B. When the clockwork mechanism is wound by turning the knob 34, the movement of the sprocket chains brings the bread carriers into the position shown at the left hand in Fig. 2, and the operation of the clockwork mechanism causes the bread carriers to move toward the right until they occupy a position at the right hand of the device. This movement causes the slices of bread to pass through the oven 12 within which they are subjected to a toasting action. The oven is preferably provided with slots in its sides, as shown in Fig. 1, and at each of its ends is provided with two openings 45 for passage of the slices of bread, these openings being separated from each other by a central member 46, as shown in Fig. 3. The top of the oven is formed by a cover plate 48 held in position by screws 50. The cover 48 is provided with slots 51 for the escape of moisture and this cover may be utilized as a support for articles which it is desired to keep in a heated condition. The two side members of the oven are provided with sets of guidewires 52 and the central member 46 is provided with two sets of guidewires 54, as will appear from Figs. 3 and 4. The side members of the oven are provided with heating elements 56 and 58 of any customary or suitable construction, and the central member 46 is provided with a similar heating element 60. Underneath the oven and supported by pieces of insulating material 62 are two bus-bars 64 and 66 with which the heating elements are in contact, the heating elements passing through slots in the cover 13 which is on the lower casing. Wires 68 and 70 attached to the bus-bars 64 and 66, respectively, serve to supply electrical current to the heating elements from any suitable source of electricity. While I have shown my toaster constructed to toast two slices of bread at a time, it is obvious that provision may be made for toasting any desired number of slices by increasing the number of bread carriers and heating elements, and increasing the lateral dimension of the oven.

The operation and advantages of my invention will be readily understood from the foregoing description. When the clockwork mechanism is wound, the bread carriers are brought to the left hand position as shown in Fig. 2, and slices of bread to be toasted are placed thereon. The operation of the clockwork mechanism gradually moves the bread through the oven and when the stems 36 and 38 reach their right hand position in the slits in the cover member 13, movement of the sprocket chains ceases and the toast occupies a position outside of the oven at the right hand thereof. On account of the movement of the bread through the oven during the toasting operation, it will be uniformly toasted without light and dark spots, and there is no danger of burning the toast since it is moved out of the oven after having been toasted for a period of time depending upon predetermined factors, such as the speed of operation of the clockwork mechanism and the size of the sprocket wheels. The operator is thus relieved of the necessity of closely watching the toasting operation and can tell at a glance when the toast is finished from the position which it occupies as well as being reminded that the toasting operation is completed by the cessation of the slight noise caused by the operating parts when in motion.

I claim:

1. A bread toaster comprising a support, a conveyor for slices of bread mounted on said support, clockwork mechanism for operating said conveyor, means for winding said clockwork mechanism and at the same time moving said conveyor in backward direction, an oven mounted on said support and through which slices of bread are moved by said conveyor, and heating means associated with said oven.

2. A bread toaster comprising a support, a conveyor mounted on said support, clockwork mechanism for operating said conveyor, means for winding said clockwork mechanism and at the same time moving said conveyor in backward direction, bread carriers attached to said conveyor, an oven mounted upon said support, said oven having openings in its opposite ends to form passageways for said bread carriers and the slices of bread carried thereby, and heating means associated with said oven.

3. A bread toaster comprising a support, shafts mounted in said support adjacent opposite ends thereof, sprocket wheels secured to said shafts, endless sprocket chains passing over said sprocket wheels, clockwork mechanism operatively connected with one of said shafts, a handle attached to said last mentioned shaft for winding said clockwork mechanism and at the same time moving said sprocket chains in backward direction, bread carriers attached to said sprocket chains, an oven mounted upon said support, said oven having openings in its opposite ends to form passageways for said bread carriers and the slices of bread carried thereby, and heating means associated with said oven.

4. A bread toaster comprising a lower casing, a cover on said casing, shafts mounted in said casing adjacent opposite ends thereof, sprocket wheels secured to said shafts, endless sprocket chains passing over said sprocket wheels, clockwork mechanism operatively connected with one of said shafts, a handle attached to said last mentioned shaft for winding said clockwork mechanism and at the same time moving said sprocket chains in backward direction, stems attached to the upper stretch of said sprocket chains and passing through slits in said casing cover, bread carriers secured to the upper ends of said stems, an oven mounted upon said lower casing, said oven having openings in its opposite ends to form passageways for said bread carriers and the slices of bread carried thereby, heating elements positioned at the sides of the passageways through said oven, and means for supplying electric current to said heating elements.

5. A bread toaster comprising a lower casing, a cover on said casing, shafts mounted in said casing adjacent opposite ends thereof, sprocket wheels secured to said shafts, endless sprocket chains passing over said sprocket wheels, clockwork mechanism operatively connected with one of said shafts, a handle attached to said last mentioned shaft for winding said clockwork mechanism and at the same time moving said sprocket chains in backward direction, stems attached to the upper stretch of said sprocket chains and passing through slits in said casing cover, bread carriers secured to the upper ends of said stems, an oven mounted upon said lower casing, said oven having openings in its opposite ends to form passageways for said bread carriers and the slices of bread carried thereby, bus-bars supported below said casing cover, heating elements mounted upon said bus-bars and extending through slots in said casing cover so as to be positioned at the sides of the passageways through said oven, guide wires attached to said oven so as to be interposed between said heating elements and the slices of bread in their passage through said oven, and means for supplying electric currents to said bus-bars.

In testimony whereof I hereunto affix my signature.

CHARLES P. STRITE.